(12) United States Patent
Sarkis

(10) Patent No.: US 11,269,894 B2
(45) Date of Patent: Mar. 8, 2022

(54) TOPIC-SPECIFIC REPUTATION SCORING AND TOPIC-SPECIFIC ENDORSEMENT NOTIFICATIONS IN A COLLABORATION TOOL

(71) Applicants: Atlassian Pty Ltd., Sydney (AU); Atlassian Inc., San Francisco, CA (US)

(72) Inventor: Rameil Sarkis, Mountain View, CA (US)

(73) Assignees: ATLASSIAN PTY LTD., Sydney (AU); ATLASSIAN INC., San Francisco, CA (US)

( * ) Notice: Subject to any disclaimer, the term of this patent is extended or adjusted under 35 U.S.C. 154(b) by 231 days.

(21) Appl. No.: 16/534,768

(22) Filed: Aug. 7, 2019

(65) Prior Publication Data

US 2020/0409962 A1 Dec. 31, 2020

Related U.S. Application Data

(60) Provisional application No. 62/867,309, filed on Jun. 27, 2019.

(51) Int. Cl.
*G06F 16/2457* (2019.01)
*G06N 5/02* (2006.01)
*G06F 16/248* (2019.01)
*G06F 7/08* (2006.01)

(52) U.S. Cl.
CPC .......... *G06F 16/24578* (2019.01); *G06F 7/08* (2013.01); *G06F 16/248* (2019.01); *G06N 5/02* (2013.01)

(58) Field of Classification Search
CPC .... G06F 16/24578; G06F 16/248; G06F 7/08; G06Q 10/101; G06Q 50/01; G06N 5/02; G06N 20/00
See application file for complete search history.

(56) References Cited

U.S. PATENT DOCUMENTS

| | | | | |
|---|---|---|---|---|
| 10,223,646 | B1* | 3/2019 | Vontobel | G06Q 10/063112 |
| 2004/0220925 | A1* | 11/2004 | Liu | G06F 16/40 |
| 2009/0049042 | A1* | 2/2009 | An | G06Q 30/02 |
| 2010/0070554 | A1* | 3/2010 | Richardson | G06Q 10/06 709/202 |
| 2013/0166565 | A1* | 6/2013 | Lepsoe | G06F 16/358 707/740 |
| 2014/0095642 | A1* | 4/2014 | Sorokin | H04L 51/00 709/206 |
| 2014/0304249 | A1* | 10/2014 | Ayzenshtat | G06F 16/9535 707/709 |
| 2015/0100509 | A1* | 4/2015 | Pappas | G06Q 50/01 705/319 |
| 2015/0154362 | A1* | 6/2015 | Masarie, Jr | G06Q 10/10 705/3 |

(Continued)

*Primary Examiner* — Etienne P Leroux
(74) *Attorney, Agent, or Firm* — Brownstein Hyatt Farber Schreck, LLP

(57) ABSTRACT

A collaboration tool configured to: (1) automatically determine a topic-specific reputation score for one or more users of the collaboration tool, (2) to store the topic-specific reputation scores in a reputation database, (3) to access the reputation database in response to receiving a user input associated with a particular topic from another user, and (4) display to the other user a list of one or more users of the collaboration tool having topic-specific reputation scores exceeding a threshold.

19 Claims, 7 Drawing Sheets

(56) References Cited

U.S. PATENT DOCUMENTS

| | | | |
|---|---|---|---|
| 2015/0262219 A1* | 9/2015 | Vock | H04L 67/22 |
| | | | 705/14.41 |
| 2015/0326625 A1* | 11/2015 | Rosenberg | H04L 65/403 |
| | | | 715/753 |
| 2016/0203412 A1* | 7/2016 | Merdivan | G06N 20/00 |
| | | | 706/11 |
| 2017/0024374 A1* | 1/2017 | Bastide | G06F 16/93 |
| 2017/0103352 A1* | 4/2017 | Kurjanowicz | G06Q 50/01 |
| 2017/0249388 A1* | 8/2017 | Alonso | G06F 16/9535 |
| 2017/0302540 A1* | 10/2017 | Monahan | H04L 41/5051 |
| 2018/0270325 A1* | 9/2018 | Bonazzoli | H04L 67/306 |
| 2019/0079936 A1* | 3/2019 | Bolshinsky | G06F 16/24578 |
| 2019/0272476 A1* | 9/2019 | Vontobel | G06N 5/022 |
| 2019/0286673 A1* | 9/2019 | Sayyadi-Harikandehei | |
| | | | G06F 7/026 |
| 2020/0034892 A1* | 1/2020 | Huang | G06Q 50/01 |

* cited by examiner

TOPIC-SPECIFIC REPUTATION SCORING AND TOPIC-SPECIFIC ENDORSEMENT NOTIFICATIONS IN A COLLABORATION TOOL

CROSS-REFERENCE TO RELATED APPLICATION(S)

This application is a nonprovisional patent application of and claims the benefit of U.S. Provisional Patent Application No. 62/867,309, filed Jun. 27, 2019 and titled "Topic-Specific Reputation Scoring and Topic-Specific Endorsement Notifications in a Collaboration Tool," the disclosure of which is hereby incorporated herein by reference in its entirety.

BACKGROUND

An organization can leverage a collaboration tool that is accessible by many individuals to facilitate completion of work related to a goal. Many conventional collaboration tools and interfaces include knowledge-sharing features—such as comment sections, forums, knowledge stores, and the like—to memorialize and organize institutional knowledge in a manner that can be reviewed by a user of the collaboration tool to determine whether a problem encountered by that user has been previously solved or otherwise addressed by another user.

In many cases, however, processes of reviewing and understanding content of knowledge-sharing features may be time and resource consuming for users, especially new or inexperienced users. For example, new or inexperienced users of a collaboration tool may not be able to readily determine how to phrase or describe a problem with sufficient accuracy or appropriate vocabulary to obtain useful results when searching a knowledge-sharing feature. Such users may also be unaware of, or unable to evaluate or verify, the reliability or accuracy of content added to a knowledge-sharing feature by other users of the collaboration tool.

SUMMARY

Some embodiments described herein relate to a method for (1) autonomously or automatically generating topic-specific endorsements of users of a collaboration tool and (2) generating a list of users of that collaboration tool that are endorsed for a specific topic. The method includes the operations of: receiving a user input to the collaboration tool via a client application communicably coupled to a host service; communicating, by the client application, the user input to the host service; assigning, by the host service, a topic tag (which may be based on semantic content of the user input) to the user input; querying, by the host service, a reputation database with the topic tag to obtain a dataset of elements (each element including a unique identifier corresponding to a user of the collaboration tool and a topic tag reputation score associated with the user); selecting, by the host service, a subset of elements (optionally sorted) of the dataset each having a topic tag reputation score that satisfies a threshold; communicating the unique identifiers of the selected subset of elements to the client application; and displaying, by the client application, each unique identifier of the selected subset of elements as users of the collaboration tool endorsed for the topic tag associated with the user input.

Some embodiments may include a configuration in which each respective topic tag reputation score is based on a count of interactions with content assigned the topic tag performed by a particular user. In some cases, the count is limited to a selected time period, such as thirty days. An example interaction that can be counted includes: replying to a comment thread of a knowledge-sharing feature of the collaboration tool; and providing an answer to a question posted to the knowledge-sharing feature. In other examples, a topic tag reputation score can be based on a user's interactions with a particular knowledge-sharing feature of the collaboration tool.

An example of a unique identifier corresponding to a user of the collaboration tool is a username (which may be an alias, nickname, or fanciful word or phrase). Another example is a legal name of a user. Another example is an email address associated with a particular user.

Certain embodiments described herein relate to methods for notifying users of a collaboration tool of topic-specific endorsements of other users of the collaboration tool. Such methods can include the operations of: receiving, at a host service, a partial user input from a first user of the client application; extracting a set of keywords from the partial user input; determining a topic tag for the partial user input based on the set of keywords; querying a reputation score database with the topic tag to obtain a second user of the collaboration tool having a topic tag reputation score exceeding a threshold; generating, by the client application, a notification to the first user with a suggestion to the first user to contact the second user regarding the partial user input. Optionally, a second notification can be generated to the second user, the second notification including a second suggestion to the second user to contact the first user regarding the partial user input.

Some embodiments may include a configuration in which the collaboration tool is an issue tracking system. In these cases, the partial user input can include an issue request title or issue request description.

Some embodiments may include a configuration in which the collaboration tool includes a knowledge-sharing feature. In these examples, the partial user input can be a question or a comment posed by the first user to other users of the knowledge-sharing feature.

The notification to the first user can optionally include the topic tag reputation score of the second user. In these and other embodiments, the topic tag reputation score of the second user may be determined automatically by the host service.

In some cases, the host service can increase the topic tag reputation score of a user in response to the user interacting with content of the collaboration tool having the topic tag. In other cases, the host service can decrease the topic tag reputation score of a user in response to the user not interacting with content of the collaboration tool having the topic tag.

Further embodiments described herein relate methods for notifying a first user of a collaboration tool of another user of the collaboration tool having a topic-specific reputation. Such methods include the operations of: receiving a partial user input from the first user to the collaboration tool via a client device executing a client application communicably coupled to a host service; determining a topic tag for the partial user input based on semantic content (e.g., a lemmatized set of words extracted from the partial user input, or a tokenized set of words extracted from the partial user input) of the partial user input; querying a reputation database with the determined topic tag to obtain a dataset of elements, each element with a topic tag reputation score associated with one respective one user of the collaboration tool; selecting an element of the dataset having the highest topic tag reputation score, communicating the selected element to the client application; displaying a name of a second user of the collaboration tool via the client application, the second user identified by the selected element to the first user of the collaboration tool; and displaying a notification via the client application, the notification with a suggestion to the first user of the collaboration tool to contact the second user of the collaboration tool. Some embodiments may include a configuration in which the topic tag reputation score of the selected element may be based, at least in part, on a job title of the second user.

BRIEF DESCRIPTION OF THE DRAWINGS

Reference will now be made to representative embodiments illustrated in the accompanying figures. It should be understood that the following descriptions are not intended to limit this disclosure to one included embodiment. To the contrary, the disclosure provided herein is intended to cover alternatives, modifications, and equivalents as may be included within the spirit and scope of the described embodiments, and as defined by the appended claims.

The use of the same or similar reference numerals in different figures indicates similar, related, or identical items.

Figure 1:
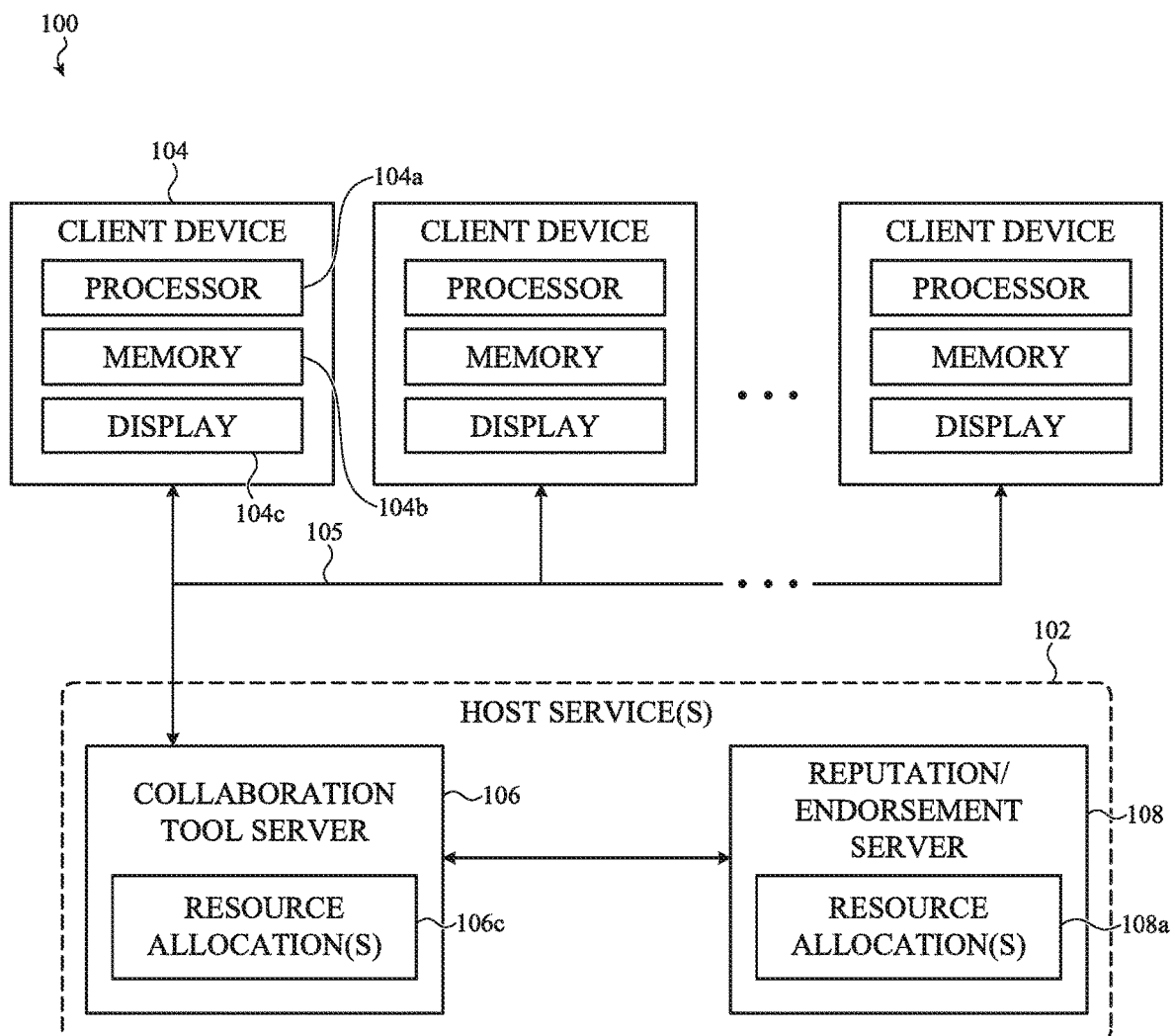
FIG. 1 is a schematic representation of a collaboration tool including a reputation/endorsement server, such as described herein.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

A collaboration tool, as described herein, is a project management tool that can be implemented in whole or in part as software executed by a virtual or physical server or other computing appliance that provides a team of individuals with a means for communicating and exchanging information with one another.

In some examples, a collaboration tool is configured for use by a software development team to exchange information that can facilitate the completion and assignment of discrete tasks related to software development projects from creation of new user stories (i.e., user-perspective feature requests or desired functionality), through proof of concept testing, through integration testing, through release of software to one or more users, and through reporting and fixing of software errors ("bugs").

In other cases, a collaboration tool can be configured for non-software related purposes, such as for use by a human resources team, an information technology support group, and so on. It may be appreciated that a collaboration tool, such as described herein can be used to exchange files or information, facilitate text, audio, or video communication, or any other suitable collaboration or communication purpose.

In this manner, a collaboration tool increases efficiency of a team of individuals working on a common goal or project by increasing the speed and efficiency by which information is shared between team members.

Embodiments described herein relate to systems and methods for informing a user of a collaboration tool that another user (or more than one user or a group of other users) of the collaboration tool has experience, expertise, and/or other familiarity with a topic of interest to the first user.

In other words, systems described herein can be configured to automatically or autonomously generate topic-specific reputation scores for all or a subset of users of a collaboration tool and, thereafter, sort, rank, or filter users of the collaboration tool based on topic-specific experience. In this manner, systems described herein can automatically "endorse" specific users of a collaboration tool on a topic by topic basis such that other users of the collaboration tool can readily and easily understand who to contact for more information on a particular topic of interest to that user and/or can readily and easily understand whether information input to the collaboration tool by a particular user is trustable.

For example, a collaboration tool leveraged by multiple users to accomplish a shared or common goal can include a knowledge-sharing feature. Example knowledge-sharing features include, but are not limited to, comment sections, forums, documentation stores, knowledge stores (e.g., "wikis"), databases, and the like.

In such embodiments, knowledge sharing features can be configured to display (or "endorse"), for each topic, subject, page, or content type (collectively, herein, "topic") shared in the knowledge sharing feature, a list of users that the system has determined have expertise or experience (herein "reputation" or a "reputation score") specific to each respective topic.

For example, a collaboration tool—such as described herein—can include a documentation store that hosts documentation that describes in detail various features of a particular software product. In these examples, on each documentation page, a list of users having experience or expertise specific to content shown on that page can be displayed. In this manner and as a result of this user interface configuration and architecture, a user of the collaboration tool who accesses the documentation store can readily understand who to contact should the user have a question or issue regarding a particular content in the documentation store.

In one specific example, a collaboration tool may be an issue tracking system used by a team of software developers tasked with maintaining an email hosting service. The collaboration tool in this example includes a knowledge sharing feature, such as a collaboratively-edited knowledge store, also referred to as a "wiki." The wiki is used by the software developers to capture institutional knowledge about various features of the email hosting service, such as, but not limited to: user authentication features; data storage features; network communication features; web-based user interface features; and so on. In this example, a developer working with the team may access the wiki to learn more about how an authentication protocol implemented by the email hosting service operates. As a result of the embodiments, systems, and methods described herein, the wiki can be configured to display to the developer a list of other members of the team of software developers that have experience and/or expertise specific to the authentication protocol. As a result of this architecture, the developer may readily understand who to contact in the team of developers with questions regarding the authentication protocol simply by accessing a wiki page associated with the authentication protocol of the email hosting service.

In other words, more generally and broadly, the systems and methods described herein both (1) automatically determine a topic-specific expertise score or reputation score of a user of a collaboration tool and (2) display that determined recommendation to other users of the collaboration tool when those users access content of the collaboration tool of the same topic.

The systems and methods described herein can generate a database of topic-specific reputation scores for each (or a subset of) user of a collaboration tool such as described herein in a number of suitable ways. Thereafter, once a database of topic-specific reputation scores is created, said database can be queried at a later time with a specific topic to obtain a list (herein, a "dataset") of users having a reputation score specific to the topic queried. Thereafter, the dataset can be sorted or filtered in any suitable manner to obtain a short list of users of the collaboration tool having a high topic-specific reputation score. In some examples, the short list can be selected by comparing reputation scores to a threshold (e.g., all scores satisfying the threshold are returned) and/or by sorting the dataset and selecting the top N users. In other cases, a short list may not be returned if no user's topic-specific reputation score satisfies a given threshold. It may be appreciated that these foregoing examples are not exhaustive; a person of skill in the art will understand that a reputation database, such as described herein, including a number of data items or data elements relating topic-specific reputation scores to individual users may be queried in any suitable manner.

As noted above, topic-specific reputation scores can be generated in a number of suitable ways. For example, in some embodiments, a system such as described herein is configured to obtain statistics describing a given user's interaction history with a collaboration tool. For example, the system can be configured to count the number of interactions a given user has with a collaboration tool—or a specific feature of a collaboration tool, such as a knowledge sharing feature—in a given time period. Example interactions with a collaboration tool that can be counted or otherwise statistically analyzed include, but are not limited to: viewing or otherwise accessing a particular page or section of a collaboration tool or a feature thereof; selecting content of a particular page or section of a collaboration tool or a feature thereof; adding content to a particular page or section of a collaboration tool or a feature thereof; sending a message to a particular user of a collaboration tool or a feature thereof; receiving a message from a particular user or set of users of a collaboration tool or a feature thereof; "liking" or "disliking" content of a particular page or section of a collaboration tool or a feature thereof; and so on.

In these embodiments, a count of user interactions with a particular page, section, or feature of a collaboration tool—such as described herein—can be optionally normalized against an average number of interactions obtained by a statistical analysis of all users of the collaboration tool. It may be appreciated that this may not be required of all embodiments.

In many cases, a topic-specific reputation score can be increased an amount for each "interaction" attributed to a particular user regarding particular content. In this manner, the system can effectively rank users of the system based on the content with which those users most frequently interact. For example, if a team of software developers includes a developer that regularly updates or reviews documentation for a feature of a software product, that developer's reputation score specific to that feature may be higher (or otherwise distinguishable from) the reputation score(s) of other developers in that software development team.

In some cases, different "interactions" attributed to the same user regarding particular content in a collaboration tool can be "scored" differently. In other words, different interactions with content can influence a topic-specific reputation score, such as described herein, in different ways. For example, if a team of software developers includes a first developer that regularly updates documentation for a feature of a software product and a second developer that regularly reads documentation of that feature, the first developer's reputation score may be higher than the second developer's reputation score. In this example, the second developer's reputation score may be higher than a third developer that has been attributed no interactions with the documentation.

It may be appreciated that the foregoing examples are not exhaustive; a number of different means of creating a "score" corresponds to a user's attributed interactions with content of a particular topic a collaboration tool may be suitable. For example, and without limitation: a reputation score, such as described herein, can be increased by a selected amount each time a user clicks a particular button in a particular interface; a reputation score, such as described herein, can be decreased by a selected amount if a user is attributed a dwell time lower than a threshold time for a particular page of a knowledge sharing feature; a reputation score, such as described herein, can be increased by a selected amount each time a user replies to a comment in a comment section of a knowledge-sharing feature of a collaboration tool; a reputation score, such as described herein, can be increased by a selected amount each time a user downloads a particular file; a reputation score, such as described herein, can be increased or decreased by a selected amount each time a user commits code to a repository of a particular project or software feature; a reputation score, such as described herein, can be increased by a selected amount each time a user receives a promotion or a title change or joins a new team of employees; a reputation score, such as described herein, can be increased or decreased by a selected amount each time a user selects and/or copies content from a knowledge-sharing feature of a collaboration tool; and so on.

For simplicity of description, the embodiments that follow reference an example method of establishing a topic-specific reputation score by counting the number of interactions a given user has with a particular topic.

Similarly, it may be appreciated that a "topic" such as described herein, can be defined and/or created in a number of suitable ways. Example topics include, but are not limited to: a particular project tracked by an issue tracking system or a collaboration tool; a keyword; a lemmatized or otherwise semantically or grammatically normalized keyword; a page or section of a knowledge sharing feature; and so on. It may be appreciated that this listing of topic types is not exhaustive and other topics or topic types may be possible in other implementations.

For simplicity of description, the embodiments that follow reference a topics that are defined by semantic content. More specifically, the embodiments that follow reference topics defined by specific keywords.

As such, more generally and broadly, embodiments described herein reference systems and methods for automatically (1) increasing and/or decreasing (in real time or on a scheduled or on-demand basis) various topic-specific reputation scores of individual users of a collaboration tool and (2) storing said topic-specific reputation scores in a database referred to as a "reputation database" and (3) querying the reputation database at a later time to determine a short list of users of the collaboration tool that can be endorsed (e.g., by having a reputation score satisfying a threshold) by the system as having experience, expertise, familiarity, or other relevant association with the specific topic submitted to the reputation database.

As a result of these constructions and architectures, a user of a collaboration tool such as described herein can be presented with a short list of experienced users that may be useful to contact for more information on any particular topic. For example, User 0 of a knowledge-sharing feature may access a first page related to a first software feature of a given software product. In this example, the system described herein can extract a keyword from the title or description of the first page, query the reputation database with that keyword (i.e., the "topic"), and determine that User 1, User 2 and User 3 all have a high reputation score related to the topic associated with the first page. Thereafter, the system can cause the knowledge-sharing feature to display the names of User 1, User 2, and User 3 as suggestions of experienced individuals that may be contacted by User 0 for more information on the topic associated with the first page.

At a later time, User 0 may access a second page related to a second software feature of the software product. As with the first page, the system described herein can extract a keyword from the title or description of the second page, query the reputation database with that keyword, and determine that User 2 has a high reputation score related to the topic associated with the second page. Thereafter, the system can cause the knowledge-sharing feature to display the name of User 2 as a suggestion of an experienced individual that may be contacted by User 0 for more information on the topic associated with the second page.

In another example, User 0 may leverage a messaging platform of the collaboration tool and may begin typing a question to a group of other users. As User 0 types the question, the system described herein can be configured to monitor for and/or extract keywords from the partial user input provided by User 0, after which the system can query the reputation database with the one or more extracted keywords, and determine that User 4, User 2, and User 7 all have a high reputation score related to the topic(s) extracted from the partial user input. In this example, the system can cause the messaging platform to display the name of Users 4, 2, and 7 to User 0 as a suggestion of experienced individuals that may be contacted by User 0—and/or mentioned by User 0 in the question—for more information about the topic(s) extracted from the partial input.

For example, User 0 may begin typing the question "does anyone know which Python modules we are able to install for XML parsing?" The system can extract keywords "Python" and "modules" and "XML parsing" using any suitable natural language processing, semantic processing, or machine learning technique. With these three phrases/keywords, the system can query the reputation database to determine that User 1 has a high reputation for the topic "Python", User 2 has a high reputation for the topic "Python" and a high reputation for the topic "modules", and User 3 has a high reputation for the topic of "XML parsing" and "Python." In one embodiment, the system can simply generate a notification to User 0 stating "Users 1, 2, and 3 may be able to assist with this question." In another embodiment, the system can ask User 0, "would you like to ping Users 1, 2, or 3 on this topic?" In another embodiment, the system can select from Users 1-3 the user with the highest combined reputation score for all three of the topics submitted as queries to the reputation database; in one example User 3 is selected because the combined (e.g., sum, product, or average) reputation the topics of "XML parsing" and "Python" is higher than the combined reputation of User 2 on topics of "Python" and "modules." In this example, the system can generate a notification to User 0 stating, "User 3 can likely answer this question."

It may be appreciated that the foregoing discrete examples are not exhaustive. More specifically, it may be appreciated that the results of a query submitted to a reputation database, such as described herein can be displayed, communicated to a user, or otherwise used to trigger another action, in any number of suitable ways. Examples include, but are not limited to: generating a notification for a user of a collaboration tool including a list of names of users endorsed by the system as having expertise (e.g., a reputation score exceeding a threshold) on a particular topic; modifying a graphical user interface of a collaborative work too to include a list of names endorsed by the system as having expertise on a particular topic; automatically messaging one or more users that anther user may need assistance with a particular topic; automatically modifying a partial user input to include a mention or reference to a name of a user endorsed by the system as having expertise on a particular topic; and so on. For simplicity of description, the embodiments that follow reference an example implementation in which a system such as described herein displays a list of names of users endorsed by the system as having expertise on a particular topic; it may be appreciated that this is merely one example and that other embodiments can be implemented in different ways and/or other implementations may utilize information obtained from a reputation database in another manner.

Independent of the particular implementation selected, however, it may be appreciated that the systems and methods described herein may be particularly useful to allow users— in particular new or inexperienced users—of collaboration tools to quickly identify other users that have topic-specific expertise. As noted above, for simplicity of description, the embodiments that follow reference a collaboration tool including a system configured to: establish and maintain topic-specific reputation scores for users by counting users' interactions with content related to specific topics; store topic-specific reputation scores in a reputation database; extract one or more topics from a partial or complete input received from a user of the collaboration tool; query the reputation database with one or more topics extracted from the user input; and/or display a list of users endorsed by the system as having threshold-satisfying reputation scores specific to the topic(s) extracted from the partial or complete input.

As a result of these and other described embodiments, a collaboration tool, such as described herein, can notify a user as the user is providing input to the system that the user may be inputting information already received by the system.

These foregoing and other embodiments are discussed below with reference to FIGS. 1-6. However, those skilled in the art will readily appreciate that the detailed description given herein with respect to these figures is for explanatory purposes only and should not be construed as limiting.

FIG. 1 is a schematic representation of an example collaboration tool, such as described herein. In the illustrated embodiment, the collaboration tool 100 is implemented with a client-server architecture including a host service 102 that communicably couples (e.g., via one or more networking or wired or wireless communication protocols) to one or more client devices, one of which is identified as the client device 104.

It may be appreciated that other client devices may be configured in a substantially similar manner as the client device 104, although this may not be required of all embodiments and different client devices can be configured differently and/or may transact data or information with, and/or provide input(s) to, the host service 102 in a unique or device-specific manner.

The client device 104 can be any suitable personal or commercial electronic device and may include, without limitation or express requirement, a processor 104a, volatile or non-volatile memory (identified, collectively, as the memory 104b), and a display 104c. Example electronic devices include, but are not limited to: laptop computers; desktop computers; cellular phones; tablet computing devices; and so on. It may be appreciated that a client device 104, such as described herein, can be implemented in any suitable manner.

In many embodiments, the processor 104a of the client device 104 can be configured to execute an application (herein referred to as a "client application") stored, at least in part, in the memory 104b. The client application is configured to access and communicate with the host service 102 and to securely transact information or data with, and provide input(s) to, the host service 102. In some embodiments, the client application may be a browser application configured to access a web page or service hosted by the host service 102 that is accessible to the client device 104 over a private or public network that may, in some embodiments, include the open internet.

In many embodiments, the host service 102 is configured to operate within or as a virtual computing environment that is supported by one or more physical servers including one or more hardware resources such as, but not limited to (or requiring) one or more of: a processor; a memory; non-volatile storage; networking connections; and the like. For simplicity of description and illustration, these example hardware resources are not shown in FIG. 1.

In many embodiments, the host service 102 can include a number of discrete subservices or purpose-configured modules, containers, or virtual machines each configured to perform, coordinate, serve, or otherwise provide one or more services, functions, or operations of the host service 102, such as (1) the operations of associating or tagging user input with particular topics and/or (2) querying a reputation database with one or more topics to obtain a dataset of topic-specific reputation scores of users of the collaboration tool 100, such as described herein.

As noted with respect to embodiments described herein, the host service 102 can be configured to implement one or more knowledge-sharing features. Examples include, but may not be limited to: comment sections; messaging platforms; knowledge stores (e.g., "wikis"); forums; and the like. For simplicity of description, the embodiments that follow reference a comment section as an example knowledge-sharing feature. It may be appreciated, however, that this is merely one example and that the embodiments described herein can be equivalently applied to other types of knowledge-sharing features and, more generally, to other portions, modules, components, or functions of a collaboration tool.

As noted above, the host service 102 of the collaboration tool 100 can be configured to categorize, tag, or otherwise assign user input—as it is being entered by a user—to one or more "topics" that may be used to query a reputation database, such as described herein. Thereafter, host service 102 of the collaboration tool 100 can be configured to provide a visual indication, notification, or other display to that user one or more endorsements of other users of the collaboration tool 100, the endorsed users having high (e.g., threshold-satisfying) reputation scores associated with the topic(s) associated with the user input.

As noted with respect to other embodiments described herein, an "endorsement" of a user for a particular "topic" as provided by a host service 102 is understood to be an indication that the host service 102 has determined that the user has a topic-specific reputation score that exceeds a threshold.

The method(s) or operation(s) by which the topic-specific reputation score is determined, established, maintained, or updated can vary from embodiment to embodiment but in many examples includes the operation of counting a number of interactions with the collaboration tool 100 with content associated with a given topic that can be attributed to the user. Example interactions that can be counted in a manner that increases or decreases a topic-specific reputation score, such as described herein include, but are not limited to: clicking particular input elements associated with a particular topic; dwelling for at least a threshold period on a page including content related to a particular topic; adding content to the collaboration tool 100 associated with a particular topic; commenting in a comment thread—or, more generally, adding content to a knowledge-sharing feature of the collaboration tool 100—related to a particular topic; and so on. As with other embodiments described herein, once a topic-specific reputation score is determined, established, adjusted or otherwise updated, it can be stored in a reputation database. The reputation database can be any suitable database or combination of databases. In one example, the reputation database is a relational database; this is merely one example and is not required. The reputation database of the host service 102 can be associated with, and/or otherwise in communication, with a collaboration tool server 106 and/or a reputation/endorsement server 108. Each of these servers/services of the host service 102n are described in greater detail below.

As noted above and with respect to other embodiments described herein, once one or more topic-specific reputation scores associated with one or more users (e.g., a single user may have many independent topic-specific reputation scores; different reputation scores for different topics), the reputation database can be configured to receive and/or otherwise process a query from the host service 102. In particular, the host service 102 can be configured to query the reputation database with a topic and/or a keyword or set of keywords or topics to retrieve results therefrom. The results obtained from the reputation database can be provided in any form or format, but in many examples, said results are provided in a structured data format readily parseable or otherwise consumable by the host service 102. Example formats include, but are not limited to: extensible markup language; javascript object notation; binary format; and so on. Once a result—referred to herein as a "dataset" of elements—is obtained by querying the reputation database, the obtained dataset can be filtered, sorted, or otherwise manipulated in any suitable manner. Thereafter, filtered, sorted, or otherwise manipulated elements derived or extracted from the dataset can be communicated back to the client device 104 and can be displayed via the client application to a user thereof as endorsement(s) by the host service 100 (and/or the collaboration tool 100) of particular users of the collaboration tool 100 with regard to the selected topic.

For example, a user may provide a comment to a knowledge-sharing feature of the collaboration tool 1000 by providing user input into a data input or user input field rendered by the client application on the client device 104. The partial or complete user input provided by the user can include a title and a body. As the user inputs content, the host service 102 of the collaboration tool 100 can determine whether the user is asking a question (e.g., based on the presence of interrogative language and punctuation) and, additionally, can extract keywords (e.g., noun phrases) from the input (including both the title and the body and/or other information, such as the user's name) to compare those keywords to one or more topics stored in a reputation database, such as may be associated with or in communication with the reputation/endorsement server 108.

For example, the collaboration tool 100 and/or the reputation/endorsement server 108 may be configured to compare keywords, or lemmatizations/normalizations thereof, to one or more topics by calculating a Levenshtein distance separating an extracted keyword and a particular topic. In other embodiments, a keyword extracted from a user input can be associated with, or otherwise linked to, a topic in any other suitable manner.

In response to a determination that a keyword or phrase extracted from a partial or complete user input is sufficiently similar to at least one topic stored in a reputation database, such as a database associated with or in communication with the reputation/endorsement server 108, the host service 102 of the collaboration tool 100 can associate (e.g., assign a tag) the input provided by the user with the identified topic(s).

Thereafter, the collaboration tool 100 can query a reputation database, which can be associated with and/or in communication with the reputation/endorsement server 108, with the identified topic(s) to obtain a dataset of elements.

Each element of the dataset obtained as a result of querying the reputation database with the identified topic(s) related to the user input can include a universally unique identifier ("UUID") or other unique identifier associated with a single user of the collaboration tool 100 (e.g., username, id, legal name, hash, and so on) and a topic-specific reputation score associated with that user and the identified topic submitted as a query to the reputation database. In other cases, each element of the dataset can include other information (e.g., more data items, fewer data items, different data items, and so on).

Thereafter, as noted with respect to other embodiments described herein, the host service 102 of the collaboration tool 100 can be configured to sort, filter, or otherwise manipulate the dataset obtained from reputation database (which may be associated with and/or in communication with the reputation/endorsement server 108) in any suitable manner. For simplicity of description the embodiments that follow reference a reputation database that is incorporated into the reputation/endorsement server 108, but this is not required and it may be appreciated that in other embodiments, a reputation database, such as described herein, can be communicably coupled to any suitable element, module, service, or server of the host service 102 of the collaboration tool 100.

In these and other embodiments, the reputation/endorsement server 108 and/or the host service 102 of the collaboration tool 100 can be configured to sort the dataset obtained from the reputation database and to extract from the dataset a threshold number of elements associated with the highest topic-specific reputation scores. For example, in one embodiment, the top three elements of the dataset are returned and the remaining elements are discarded or otherwise ignored.

In other embodiments, the reputation/endorsement server 108 and/or the host service 102 of the collaboration tool 100 can be configured to filter the dataset to include only elements associated with topic-specific reputations scores that exceed a threshold value. For example, in one embodiment, topic-specific reputation scores range between 0 and 1; in this example, only elements of the dataset that include topic-specific reputation scores exceeding 0.8 may be returned. If no elements of the dataset include a topic-specific reputation score exceeding the threshold (e.g., 0.8 in this example), then no elements may be returned. In other cases, in the circumstance that no elements of the dataset obtained from the reputation database include a topic-specific reputation score exceeding the threshold, then the dataset may be sorted and a threshold number of elements may be returned.

Thereafter, the one or more elements from the sorted and/or filtered dataset obtained from the reputation/endorsement server 108 can be communicated using a suitable method (e.g., according to any suitable protocol or using any suitable technology) to the client device 104. Thereafter, the client application executing on the client device 104 can display or cause to be displayed to the user one or more names of users associated with the one or more elements from the sorted and/or filtered dataset.

In this manner, and as a result of these described constructions, as the user of the client application on the client device 104 inputs data to the client application which, in turn, communicates that data to the collaboration tool 100 or, more particularly, to the collaboration tool server 106, that user can be presented, in real time, with a listing of other users of the collaboration tool 100 that may have experience and/or expertise useful to that user. In other words, in a specific example, a user of the client application may begin typing a question to post to a knowledge-sharing feature of the collaboration tool 100. The question posed by the user in this example may read "should Project X support protocol Y?" Upon receiving this input, the host service 102 can extract the keywords "Project X" and "Protocol Y" which, in turn, can be correlated by the host service 102 and/or reputation/endorsement server 108 to the topics of "Project X" and "Protocol Y." Thereafter, these identified topics can be submitted as queries to a reputation database which can return a dataset containing a set of elements, each element corresponding to one unique user of the collaboration tool 100 and a topic-specific reputation score of that user related to either "Project X" or "Protocol Y." Thereafter, the dataset obtained from the reputation server can be filtered or sorted based on the topic-specific reputation scores to determine or otherwise infer which users of the collaboration tool 100 have the highest reputation score for each topic of interest—namely "Project X" and "Protocol Y"—to the user. Thereafter, the host service 102 can communicate the short list of users having the highest reputation score(s) to the client application for display or presentation to the user. In this manner, simply by entering content into the client application executed by the client device 104, the user may be automatically informed of the individuals that have the experience and/or expertise most relevant to the interest(s) of that user.

In another example, if the user beings typing into the client application of the client device 102 a comment that includes the phrase "Apple iOS application user interface", the collaboration tool 100 and, in particular, the host service 102 of the collaboration tool 100 can extract keywords from the user input, can determine whether any extracted keyword is sufficiently or statistically similar to one or more topics stored in a database of the reputation/endorsement server 108, query the reputation service with those identified topics, and display to the user a list of users that may have experience and/or reputation relevant to the phrase(s) input by the user. For example, the host service 102 may determine that User 1 and User 2 have high reputation score (e.g., 0.95) on the topic of "Apple iOS," that User 3 has a high reputation score (e.g., 0.80) on the topic of "User Interface" and that User 4 has a middling reputation score (e.g., 0.50) on the topic "Apple iOS" and a high reputation score (e.g., 0.70) on the topic of "User Interface." In this example, the host service 102 may recommend to the user of the client device 104 to contact User 1, User 2 and/or User 3.

To facilitate these and other operations, the host service 102 includes a collaborative work interface server 106 configured to receive inputs provided by a user from the client device 104 via the network 105. As noted with respect to other embodiments described herein, as an input provided by a user—and/or portions thereof—is received from the client application executed by the client device 104, the collaborative work interface server 106 can communicate with the reputation/endorsement server 108 that is trained, in some embodiments, to perform an analysis on the input provided by a user received by the collaborative work interface server 106. For example, the reputation/endorsement server 108 can be determined to assess relationship(s) between input(s) provided by the user and existing topics stored in a database, referred to herein as the "reputation database" of the reputation/endorsement server 108.

To perform these and other operations, the reputation/endorsement server 108 of the host service 102 can be trained, updated, and/or configured by analyzing a set of topics associated with, and/or extracted from, data stored in one or more databases of the collaboration tool 100. Iteratively or otherwise, the reputation/endorsement server 108 can consume content associated with one or more previous user inputs and/or content of one or more knowledge-sharing features of the collaboration tool 100 of a given set of previously-received previous user inputs to assemble a database or corpus of topics that can be added to and/or otherwise tracked by a reputation database, such as described herein.

Example previous user inputs that can be supplied to the reputation/endorsement server 108 can include, but may not be limited to: previously opened issue requests or reports tracked by an issue tracking system in communication with the collaboration tool 100; previously closed issue requests or reports of an issue tracking system in communication with the collaboration tool 100; previous user inputs related to a particular project; previous user inputs related to a particular epic; previous user inputs related to a particular story; previous user inputs related to a particular company or company type (e.g., software development corporation, human resources corporation, project management corporation); previous user inputs in a particular forum; content of a knowledge store; content of a forum; content of a comment section; and so on.

Data extracted from such content can be consumed by the reputation/endorsement server 108 to train and/or define one or more operations of the reputation/endorsement server 108 and can include, but may not be limited to: issue or comment title; issue or comment description; issue or comment summary; links; relationships; dependencies; projects; tags, groups, clusters, or categorizations; and so on.

The foregoing examples are not exhaustive and it may be appreciated that other data or content may be used by a collaboration tool, such as described herein, to train, update, and/or define or inform one or more operations of the reputation/endorsement server 108.

Thereafter, the data consumed by the reputation/endorsement server 108 can be analyzed (and, optionally, normalized, lemmatized, segmented, or otherwise preprocessed) to determine whether statistical inferences can be derived therefrom. In this manner, a database of terms and phrases (collectively, herein "keywords") can be created—which can be stored by the reputation database and/or the reputation/endorsement server 108—in which certain keywords used in an input provided by a user or report are associated with a statistical likelihood that the input provided by a user is, or should be, associated with a particular topic or tag.

In still further examples, data consumed by the reputation/endorsement server 108 can be analyzed in a different manner to further train or define a behavior of the reputation/endorsement server 108; for example, in some embodiments, one or more topic modeling operations (e.g., Latent Dirichlet Allocation operation(s), Non-negative Matrix Factorization operation(s), and so on). In this example, clusters of (optionally, lemmatized) words or phrases related to a particular topic model or other semantic structuring can be added to a database and flagged as associated with inputs provided by a user or reports known to be associated with at least one other input provided by a user or report or, alternatively, associated with no other inputs provided by a user or reports.

It may be appreciated that the foregoing is not exhaustive; the reputation/endorsement server 108 can be trained and/or defined or configured to operate in any suitable manner. Example sets of previous user inputs that can be used to train the reputation/endorsement server 108 can include (without limitation): all previous user inputs stored by the collaboration tool 100, regardless of client, epic, story, project, group, or otherwise; only previous user inputs associated with a particular client or business; only previous user inputs associated with a particular client or user type (e.g., large-cap companies, small-cap companies, software development companies, human resources companies, and so on); only previous user inputs associated with a particular group of users (e.g., a particular software development group); only previous user inputs associated with a particular project; only previous user inputs associated with a particular product platform (e.g., Apple iOS® software project or Google Android® software product); and so on.

The preceding examples are not exhaustive; it may be appreciated that in some embodiments training data supplied to, and consumed by, the reputation/endorsement server 108 can be limited, curated, or otherwise tailored in any suitable manner. Alternatively, training data can be entirely unlimited and may span different users, different instances of different collaboration tools, and so on. In different embodiments, different training data—or sets of training data—may be appropriate, preferred, or otherwise used.

For example, as noted above, the reputation/endorsement server 108 can be configured to consume content of an input provided by a user as it is being entered by a user. More specifically, as a user enters content to an input provided by a user form (e.g., displayed by the display 104c of the client device 104) prior to submitting the input provided by a user to the collaboration tool 100, the partially-complete input provided by a user content entered by the user can be received by the collaboration tool 100. In response, the reputation/endorsement server 108 can extract keywords, perform a text normalization operation (e.g., sentence segmentation, lemmatization, stop word removal, and so on), and/or perform one or more topic modeling operations to determine a topic or more than one topic that can be associated with the partial user input.

Thereafter, the reputation/endorsement server 108 can compare the resulting keywords, normalized text, and/or topic models (collectively, herein "extracted features") to the previously-generated database(s) of topics, keywords, text, and/or topic models known to be associated with specific topics (collectively, herein "topic-signaling features").

In a more simple phrasing, the reputation/endorsement server 108 can assemble a database of topic-signaling features. If an input provided by a user includes a word or phrase that is within the database of topic-signaling features, the input can be presumed to be a member of that category. For example, the words "syntax," "format," and "compiler," may be determined by the reputation/endorsement server 108 as features that signal a topic of "debugging software;" if a partial or complete user input includes any of these words, the reputation/endorsement server 108 may determine that the user input is associated with the topic of "debugging software."

Optionally, the reputation/endorsement server 108 can also compare the features extracted from the partially-complete input provided by a user content to the previously-generated database(s) of keywords, text, and/or topic models known to not be associated with a particular topic (collectively, herein "topic-disqualifying features").

In a more simple phrasing, the reputation/endorsement server 108 can assemble a database of topic-disqualifying features. If an input provided by a user includes a word or phrase that is within the database of topic-disqualifying features, the input can be presumed to not be associated with that topic. For example, the words "python", "objective-c", and "swift" may be determined by the reputation/endorsement server 108 as features that disqualify a user input from being associated with the topic of "javascript."

It may be appreciated that the reputation/endorsement server 108 can compare extracted features (e.g., from a user input) to topic-disqualifying features and topic-signaling feature in any number of suitable ways. Examples include, but are not limited to, calculations and/or operations to determine: Levenshtein distance; cosine similarity calculation; Manhattan distance calculation; semantic similarity; lemmatized string similarity; term frequency comparison; document or field term frequency comparisons; Jaro-Winkler distance; Jaccard similarity; and the like.

In many cases, a comparison leveraged by the reputation/endorsement server 108 can output a similarity value or score that can be compared against a similarity threshold to determine whether an extracted feature is sufficiently similar to a topic-signaling feature and/or a topic-disqualifying feature.

It may be appreciated that such similarity thresholds can vary from embodiment to embodiment and from comparison technique or method to comparison technique or method. For example, a similarity threshold related to a Levenshtein distance calculation may be different from a similarity threshold related to a cosine similarity calculation.

Once a determination is made by the reputation/endorsement server 108—and/or another subsystem or module of the host service 102—that a particular extracted feature is sufficiently similar to one or more relationship-signaling and/or topic-disqualifying features, the reputation/endorsement server 108 can determine and output a statistical confidence or value that corresponds to a likelihood that the input provided by a user should be associated with a particular topic.

For example, the reputation/endorsement server 108 may determine that an input provided by a user includes four extracted features that are sufficiently similar to entries in a topic-signaling feature database associated with the topic of "Python Modules" and also includes two extracted features that are sufficiently similar to entries in a topic-signaling feature database associated with the topic of "Email." In this example, the reputation/endorsement server 108 may determine a high likelihood that, because more features are associated with the topic of "Python Modules," that the user input should be associated with the topic of "Python Modules". Similarly, the reputation/endorsement server 108 may determine a low likelihood that, because fewer features are associated with the topic of "Email" that the user input does not substantively correspond to the topic of "Email".

Thereafter, the determined likelihood(s) can be compared to one or more confidence threshold(s). Upon determining that the determined likelihood(s) output from the reputation/endorsement server 108 satisfy the confidence threshold (s)—which may vary from embodiment to embodiment—the reputation/endorsement server 108 can search for similar content already received by the collaboration tool.

As noted above, it may be appreciated that the reputation/endorsement server 108 can compare user input and/or extracted features of a user input to a database of topics, or extracted features of previously received content, in any number of suitable ways. Examples include, but are not limited to, calculations and/or operations to determine: Levenshtein distance; cosine similarity calculation; Manhattan distance calculation; semantic similarity; lemmatized string similarity; term frequency comparison; document or field term frequency comparisons; Jaro-Winkler distance; Jaccard similarity; and the like.

Upon determining that the user input should be associated with a particular topic, the reputation/endorsement server 108, and/or another portion of the collaboration tool 100, can query the reputation database with the topic and can forward results of that query to the client device 104 to provide a visual indication or other notification or display (e.g., via the display 104c) to the user to endorse other users of the collaboration tool 100. As noted above, the visual indication can be presented at any suitable time, in any suitable manner, including any suitable quantity or density of information.

It may be appreciated that the foregoing examples are not exhaustive. More generally and broadly, it is appreciated that the collaboration tool 100 and in particular the reputation/endorsement server 108 of the collaboration tool 100 can be configured to leverage, utilize, or employ any suitable pattern recognition or classification algorithm, probabilistic model, machine learning technique (whether trained or untrained), artificial intelligence method, or any suitable combination thereof, to detect, define, determine, or otherwise infer one or more patterns in, and/or logical or causal relationships between specified or extracted topics, different user inputs, different issue content, successions or sequences of issues, or groups of issues reported to the collaboration tool 100.

Accordingly, it is appreciated that the foregoing embodiment depicted in FIG. 1 and the various alternatives thereof and variations thereto are presented, generally, for purposes of explanation, and to facilitate an understanding of various configurations and constructions of a system, such as described herein. However, it will be apparent to one skilled in the art that some of the specific details presented herein may not be required in order to practice a particular described embodiment, or an equivalent thereof.

For example, the collaboration tool 100 of FIG. 1 can be implemented in a number of suitable ways. As illustrated, the host service 102 includes one or more purpose-configured modules or components each configured to perform a discrete task associated with the operation of the collaboration tool 100.

In particular, as noted above, the host service 102 includes a collaborative work interface server 106 and an reputation/endorsement server 108. It may be appreciated that although these functional elements are identified as separate and distinct "servers" that each include allocations of physical or virtual resources (identified in the figure as the resource allocations 106a and 108a, respectively)—such as one or more processors, memory, and/or communication modules (e.g., network connections and the like)—that such an implementation is not required. More generally, it may be appreciated that the various functions described herein of a host service 102 can be performed by any suitable physical hardware, virtual machine, containerized machine, or any combination thereof.

Figure 2:
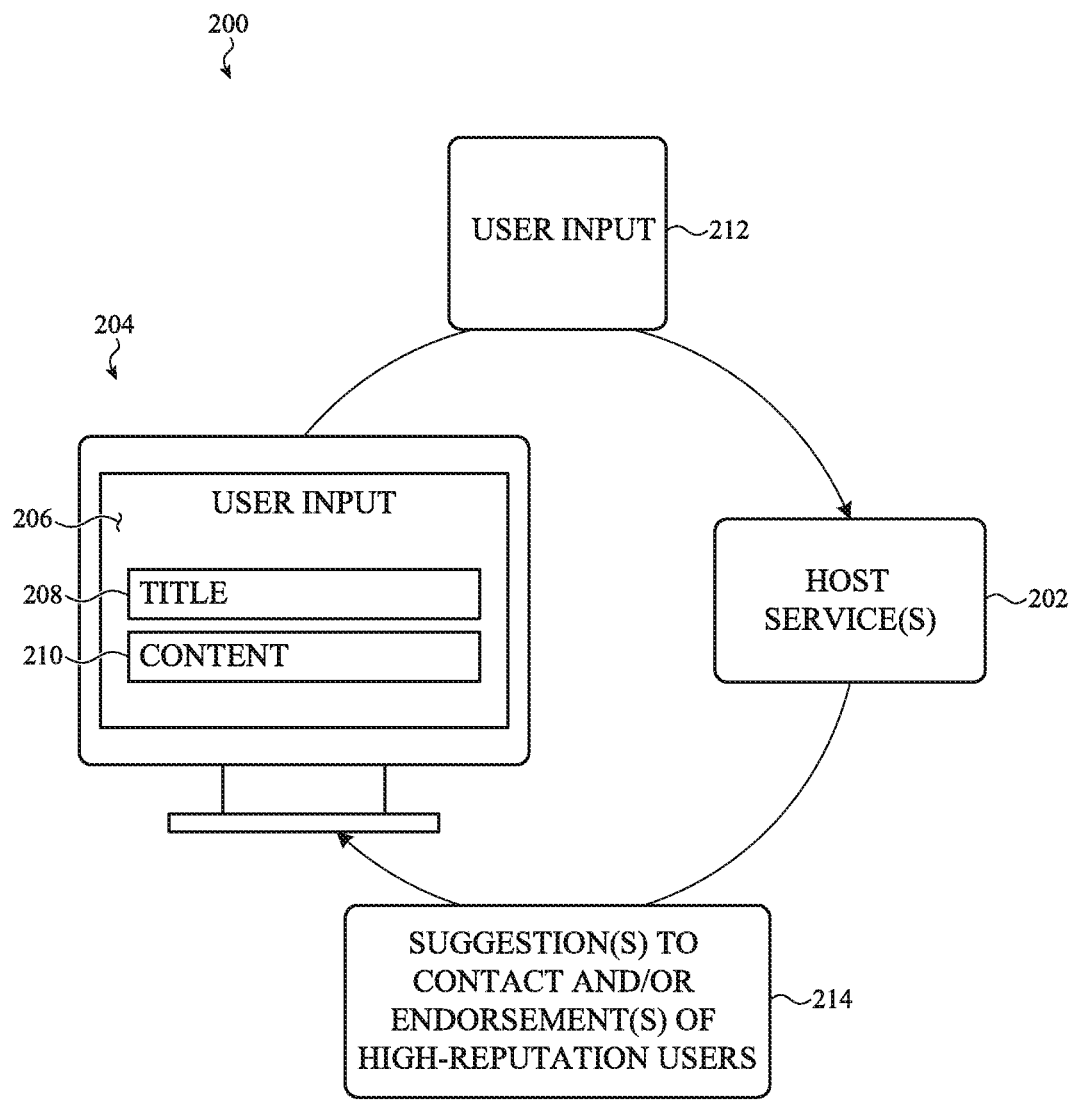
FIG. 2 is a system and process flow diagram of a reputation/endorsement server of a collaboration tool, such as described herein.

FIG. 2 depicts an example signal flow diagram depicting communications between a client application operating on a client device and a host service of a collaboration tool, such as described herein. More specifically, as with the embodiment depicted in FIG. 1, the collaboration tool 200 includes a host service 202 in communication with a client device 204.

In this illustrated embodiment, the client device 204 can execute an instance of a client application 204a that can be configured to access one or more knowledge-sharing features of the collaboration tool 200, such as a comment section. The client application 204a can render a graphical user interface 206.

The graphical user interface 206 can be used by a user to submit one or more inputs to the client application that, in turn, can be communicated to the host service 202. More specifically, the graphical user interface 206 can render one or more data entry fields, such as the data entry fields 208, 210 illustrated in the figure, that can receive data entered by a user.

In one specific implementation of this example embodiment, a user can operate the graphical user interface 206 of the client application 204 to enter data into either or both of the data entry fields 208, 210 to generate an input 212— which can be partial or complete comment content—that can be submitted to the host service 202.

In response to receiving the input 212, the host service 202—or, more precisely, an reputation/endorsement server or service of the host service 202 (see, e.g., FIG. 1)—can perform one or more operations. For example, the host service 202 can determine whether the input 212 includes an extractable feature related to one or more topic-signaling features and/or topic-disqualifying features based on, without limitation: a title of the input 212 (e.g., keywords, semantic content, lemmatized content); a description of the input 212; a tag or group identifier of the input 212; and so on.

Thereafter or therewith, the host service 202 can compare the content of the input 212 to other content stored by, or accessible to (e.g., via a third-party database or internet-accessible database or service) to the collaboration tool 200 that may, in turn, be associated with a particular topic stored in a reputation database accessible to the host service 102.

For example, the host service 202 can determine that the input 212 is associated with a first topic and a second topic. Thereafter, the host service 202 can query a reputation database with the first topic and/or the second topic to obtain a dataset that includes a listing of users of the collaboration tool 200 that have a threshold-satisfying reputation with respect to the first topic and/or the second topic.

Thereafter, the host service 202 can communicate back to the client application 204 an endorsement of (and/or a suggestion to the user to contact one or more of) the users of the collaboration tool 200 identified—either or directly or indirectly—in the dataset returned from the reputation server.

The foregoing embodiments depicted in FIGS. 1-2 and the various alternatives thereof and variations thereto are presented, generally, for purposes of explanation, and to facilitate an understanding of various configurations and constructions of a system, such as described herein. However, it will be apparent to one skilled in the art that some of the specific details presented herein may not be required in order to practice a particular described embodiment, or an equivalent thereof.

For example, it may be appreciated that a user interface rendered, shown, displayed, or otherwise accessed by or generated by a client device, such as the client device 204, can take any number of suitable forms.

Figure 3A:
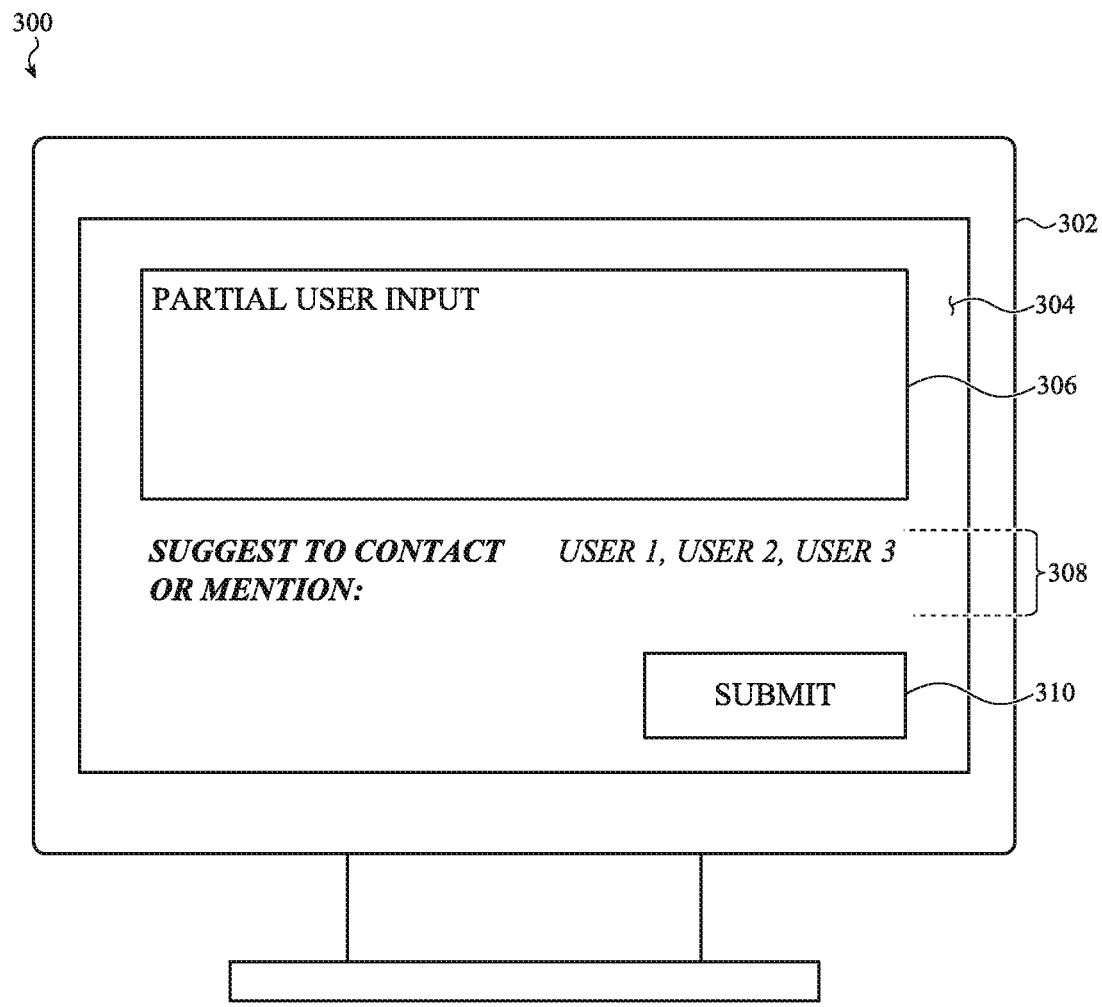
FIGS. 3A-3B depict example user interfaces that may be associated with a collaboration tool, such as described herein.

For example, FIG. 3A depicts a collaboration tool interface 300 that can be rendered or otherwise shown by a client application executed on a client device 302 as described above with respect to FIGS. 1-2. The collaboration tool interface 300 can include a number of sections, segments, or areas that are associated with different selectable options, different information, or different tools that may be available to a user of the collaboration tool interface 300.

In the illustrated embodiment, a feature selection window 304 can be used by a user of the collaboration tool interface 300 to select between one or more features of the collaboration tool interface 300. Example features, some of which are not shown, may include: text chat; video chat; audio chat; settings; workspace; search; knowledge-sharing features; and so on.

In this embodiment, a user input area 306 can be configured to receive user input from a user of the client device 302. As with other embodiments described herein, once a partial user input is provided by a user to the user input area 306, a host service such as described herein can, without limitation: extract one or more keywords from the partial user input; associated the one or more keywords with one or more topics; query a reputation database with the one or more topics; retrieve results of the query of the reputation database and optionally filter and/or sort the results obtained from the query of the reputation database; and communicate the optionally filtered and/or sorted results obtained from the query of the reputation database back to the client device 302.

Thereafter, one or more users' names associated with users identified in the results obtained from the query of the reputation database can be displayed to the user in a suggestion and/or endorsement area 308. As a result of this construction and user interface architecture, a user of the user input area 306 and, more generally, the client device 302, can be presented with one or more endorsements of one or more users of the collaboration tool that may have expertise and/or special experience in the topic(s) associated with the user input supplied to the user input area 306. This arrangement may encourage the user to contact one or more of the identified users in lieu of submitting new content to the collaboration tool by selecting a submit button 310.

Figure 3B:
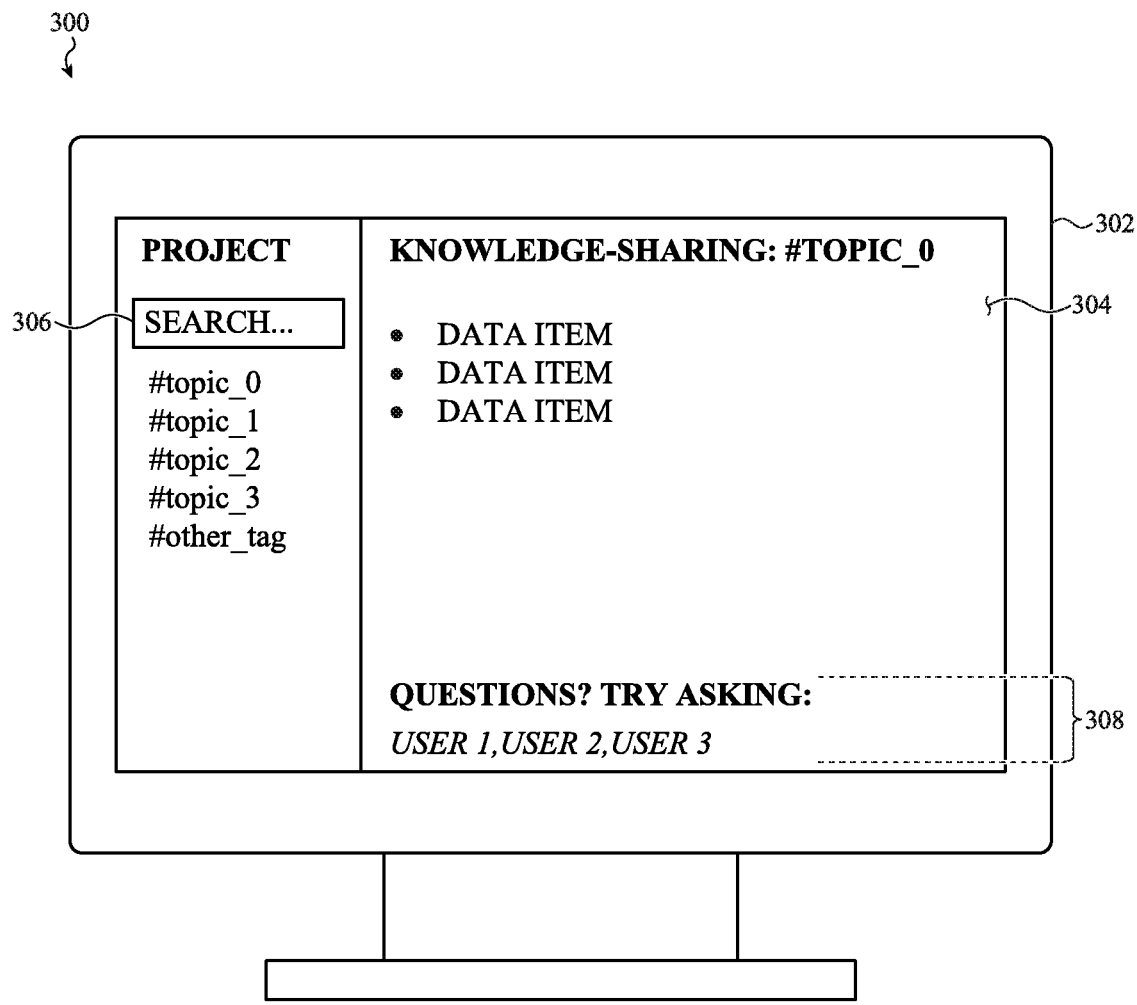

FIG. 3B depicts another example user interface. In particular, the collaboration tool interface 300. In this example the collaboration tool interface 300 executed by a client device 302 can be an interface associated with a knowledge sharing feature of a collaboration tool, such as described herein. The knowledge sharing feature can provide a common interface for users of the collaboration tool to share information with other users of the same collaboration tool. Information, content, or other contents of the knowledge sharing tool can be organized in any suitable manner, such as by topic or topic tags. In some cases, topic tags can be automatically generated when a user adds content to a particular section of the knowledge sharing feature (e.g., by topic modeling, by semantic component extraction, by lemmatization, and so on). In other cases, topic tags or other meta data or descriptive information can be manually added by one or more users of the collaboration tool.

As with the preceding embodiment, in the illustrated embodiment, a feature selection window 304 can be used by a user of the collaboration tool interface 300 to select between one or more features of the collaboration tool interface 300. In this example, one or more topics can be selected (or searched for) on a left portion of the feature selection window 304. Example features, some of which are not shown, may include: text chat; video chat; audio chat; settings; workspace; search; knowledge-sharing features; and so on.

In this embodiment, a user input area 306 can be configured to receive user input from a user of the client device 302. As with other embodiments described herein, once at least a partial user input is provided by a user to the user input area 306, a host service such as described herein can, without limitation: extract one or more keywords from the partial user input; associated the one or more keywords with one or more topics; query a reputation database with the one or more topics; retrieve results of the query of the reputation database and optionally filter and/or sort the results obtained from the query of the reputation database; and communicate the optionally filtered and/or sorted results obtained from the query of the reputation database back to the client device 302. Thereafter, one or more users' names associated with users identified in the results obtained from the query of the reputation database can be displayed to the user in a suggestion and/or endorsement area 308.

It may be appreciated that the foregoing example is not exhaustive of the various types of interfaces and/or methods of presenting data or information to a user of a collaboration tool such as described herein may be used. Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Figure 4:
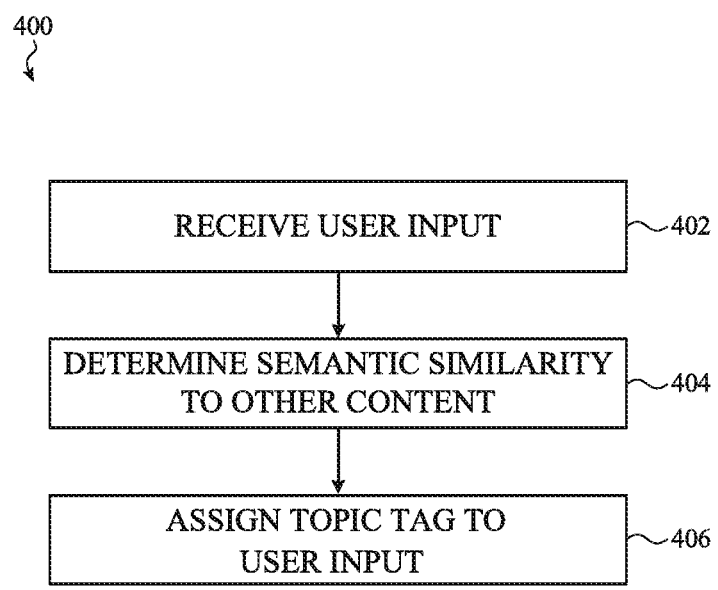
FIG. 4 is a flow chart that depicts example operations of a method of tagging user input with a topic tag in advance of querying a reputation/endorsement server, such as described herein.
Figure 5:
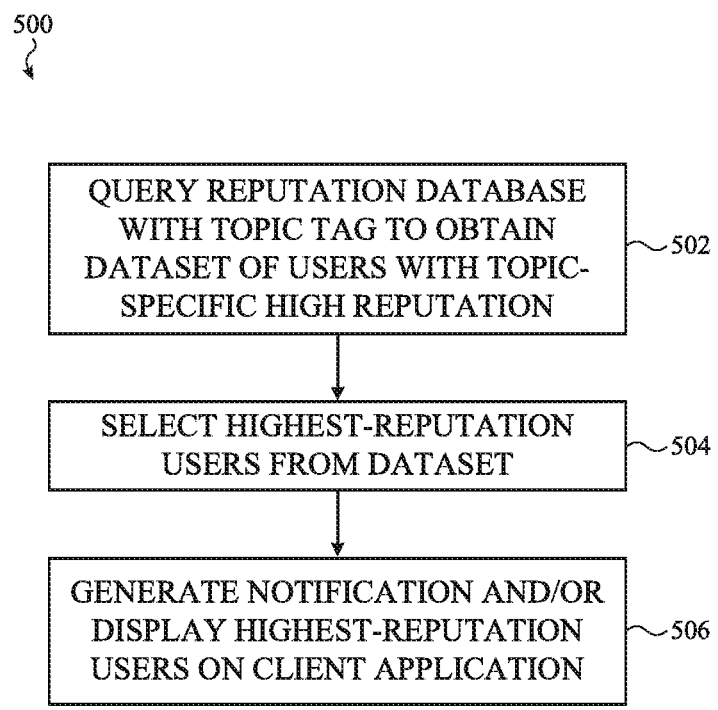
FIG. 5 is a flow chart that depicts example operations of a method of querying a reputation/endorsement server, such as described herein.
Figure 6:
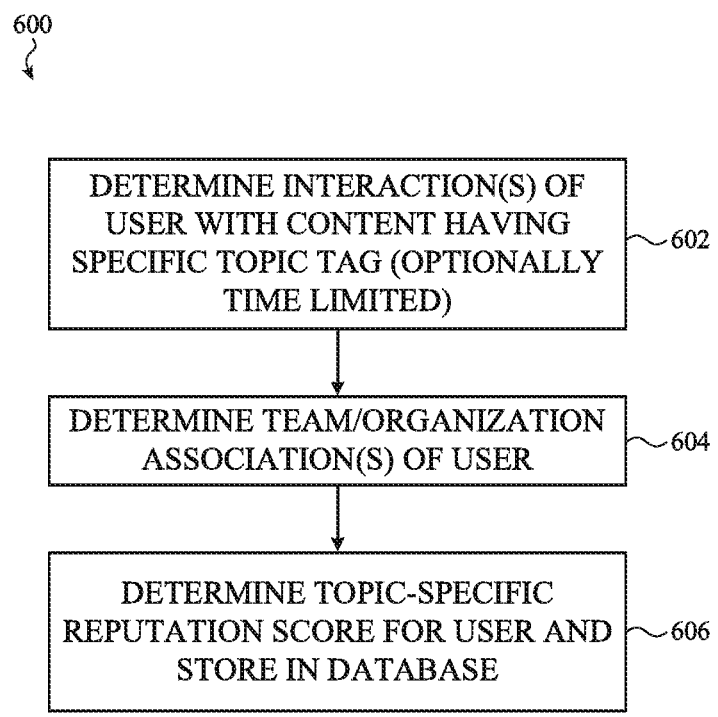
FIG. 6 is a flow chart that depicts example operations of a method of determining a topic-specific reputation score for a user of a collaboration tool, such as described herein.

Generally and broadly, FIGS. 4-6 depict flow charts corresponding to example simplified methods of operating a system, such as described herein.

FIG. 4 is a flow chart that depicts example operations of a method of tagging user input with a topic tag in advance of querying a reputation/endorsement server, such as described herein. The method can be performed in whole or in part by a host service, such as described herein. An example of a host service is described in reference to FIGS. 1-3.

The method 400 includes operation 402 in which a user input is received. As noted with respect to other embodiments described herein the user input can be captured while the user is providing input (e.g., a partial user input) or may be captured after a user indicates that the user input is complete, such as by selecting a button. The user input—which may be a complete or partial user input—can be provided by a user operating a client device and/or a client application executed by a client device such as described herein. Once input is provided by the user to the client application, said information can be communicated to a host service such as described herein in any suitable manner. More specifically, input—such as plain text input—provided by a user can be received at an input area rendered by a graphical user interface of a client application executed by the client device. Thereafter, a processor or other processing component of the client device can generate a data packet or a set of data packets corresponding to the user input (along with other data, such as metadata) and can instruct a communications component of the client device to communicably couple to (if not communicably coupled already) the a corresponding communications component of the host service. For example, a networking module of the client device can communicate via a networking protocol to another networking module of the host device.

The method 400 also includes operation 404 in which semantic content of the input provided at operation 402 is determined. A determination of semantic content can include, without limitation: determining noun phrases in the user input; lemmatizing phrases and/or terms of the user input; semantically tagging one or more words of the user input; performing a comparison of one or more keywords extracted from the user input to one or more terms stored in a database of keywords, a database of topic-signaling features, and/or a database of topic-disqualifying features.

The method 400 further includes operation 406 in which a selected topic or topic tag is associated with the user input. In this manner, an arbitrary user input submitted to a collaboration tool, such as described herein, can be normalized and/or otherwise preprocessed in order to associate that input with a topic stored in a reputation database such as described herein.

FIG. 5 is a flow chart that depicts example operations of a method of querying a reputation/endorsement server, such as described herein. As with the method 400, the method 500 can be performed in whole or in part by a host service, such as described herein. An example of a host service is described in reference to FIGS. 1-3.

The method 500 includes operation 502 in which a reputation database—such as described herein—is queried with a specific topic. The topic, in many examples, is obtained from a user input, such as referenced above with respect to FIG. 4. Once the reputation database is queried with the topic, a dataset of users having at least a threshold topic-specific reputation can be obtained. In many cases, the dataset may be filtered and/or limited based on a threshold reputation score; only users having a topic-specific reputation score exceeding or otherwise satisfying a selected threshold may be included in the dataset.

The method 500 also includes operation 504 in which a subset of the elements of the dataset are selected. In some cases, a threshold number of elements are selected from a sorted copy or representation of the dataset. In other cases, only users having a topic-specific reputation score exceeding a threshold value are selected.

The method 500 further includes operation 506 in which a notification and/or other visual indication is provided to a user. For example, such as described above with reference to FIGS. 2-3, a listing of users having a high reputation score related to a specific topic can be shown and/or communicated to a client application.

FIG. 6 is a flow chart that depicts example operations of a method of determining a topic-specific reputation score for a user of a collaboration tool, such as described herein. As with the method 400, and as with respect to other embodiments described herein, the method 600 can be performed in whole or in part by a host service, such as described herein. An example of a host service is described in reference to FIGS. 1-3.

The method 600 includes operation 602 in which interactions attributable to a particular user and associated with a particular topic (or topic tag or other topic identifier) are counted. In some cases, the operation 602 can be time limited; counts can be determined on a rolling window (e.g., within the last day, week, month, and so on) basis or any other suitable time limited basis. In these examples, reputation scores may diminish over time if a user reduces the frequency with which the user interacts with content associated with a particular topic.

The method 600 also includes operation 604 in which a team and/or organization associated with a particular user—such as a user identified at operation 602—is determined.

Thereafter, at operation 606, the method 600 can determine a topic-specific reputation score for the user determined at operation 602 and/or the user determined at operation 604. In some cases, the information obtained through the operations 602 and 606 can inform the topic-specific reputation score. For example, a senior developer (as determined by operation 604) may have a higher reputation score despite interacting with content associated with a particular topic less frequently than a junior developer.

In other cases, other data can be used to inform a topic-specific reputation score. Examples include but are not limited to: biasing topic-specific reputations scores up or down based on an average number of users interacting with content assigned to a particular topic or topic tag; biasing topic-specific reputations scores up or down based on a number of interactions with a particular type of knowledge sharing feature (e.g., adding content to a wiki page yields greater reputation than adding comments in a comment section); and so on.

It is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Accordingly, one may appreciate that although many embodiments are disclosed above, that the operations and steps presented with respect to methods and techniques described herein are meant as exemplary and accordingly are not exhaustive. One may further appreciate that alternate step order or fewer or additional operations may be required or desired for particular embodiments.

Although the disclosure above is described in terms of various exemplary embodiments and implementations, it should be understood that the various features, aspects, and functionality described in one or more of the individual embodiments are not limited in their applicability to the particular embodiment with which they are described, but instead can be applied, alone or in various combinations, to one or more of the some embodiments of the invention, whether or not such embodiments are described and whether or not such features are presented as being a part of a described embodiment. Thus, the breadth and scope of the present invention should not be limited by any of the above-described exemplary embodiments but is instead defined by the claims herein presented.

What is claimed is:

1. A method for autonomously generating topic-specific endorsements of users of a collaboration tool and generating a list of users of the collaboration tool endorsed for a specific topic, the method comprising:
  receiving a user input to the collaboration tool via a client application communicably coupled to a host service;
  communicating, by the client application, the user input to the host service;
  assigning, by the host service, a topic tag to the user input;
  querying, by the host service, a reputation database with the topic tag to obtain a dataset of elements, each element comprising:
    a unique identifier corresponding to a respective one user of the collaboration tool; and
    a topic tag reputation score associated with the respective one user;
  selecting, by the host service, a subset of elements of the dataset each having a topic tag reputation score that exceeds a threshold thereby indicating that the respective user of the collaboration tool can be endorsed by the host service as having a high reputation with respect to the topic tag;
  communicating the unique identifiers of the selected subset of elements to the client application; and
  displaying, by the client application, each unique identifier of the selected subset of elements as users of the collaboration tool that are endorsed by the host service as having a high reputation for the topic tag associated with respect to the user input.

2. The method of claim 1, wherein each respective topic tag reputation score of the dataset is based on a number of interactions with content assigned the topic tag performed by the respective user.

3. The method of claim 2, wherein each respective topic tag reputation score of the dataset is based on a number of interactions with content assigned the topic tag performed by the respective user in a selected time period.

4. The method of claim 3, wherein the selected time period is thirty days.

5. The method of claim 3, wherein an interaction of the number of interactions comprises one or more of:

replying to a comment thread of a knowledge-sharing feature of the collaboration tool; and providing an answer to a question posted to the knowledge-sharing feature.

6. The method of claim 1, wherein the topic tag is based on semantic content of the user input.

7. The method of claim 1, wherein each respective unique identifier of the dataset comprises a username or a legal name associated with each respective user.

8. The method of claim 1, wherein the tag-specific reputation score results from a reputation assessment comprising determining, by the host service, a number of interactions by the user with a particular knowledge-sharing feature of the collaboration tool.

9. The method of claim 1, comprising, prior to selecting the subset of elements:

sorting, by the host service, the dataset based on the topic tag reputation score of each element.

10. A method for notifying users of a collaboration tool of topic-specific endorsements of other users of the collaboration tool, the collaboration tool comprising a host service and a client device executing a client application configured to receive a user input, the method comprising:

receiving, at the host service, the user input from a first user of the client application;

extracting a set of keywords from the user input;

determining a topic tag for the user input based on the set of keywords;

querying a reputation score database with the topic tag to obtain a second user of the collaboration tool having a topic tag reputation score exceeding a threshold, thereby indicating that the second user can be endorsed by the host service as having a high reputation with respect to the topic tag;

generating, by the client application:

a first notification to the first user comprising a first suggestion to the first user to contact the second user regarding the user input; and a second notification to the second user, the second notification comprising a second suggestion to the second user to contact the first user regarding the user input.

11. The method of claim 10, wherein:

the collaboration tool is an issue tracking system; and the user input comprises an issue request title or description.

12. The method of claim 10, wherein:

the collaboration tool comprises a knowledge-sharing feature; and the user input comprises a question or a comment posed by the first user to other users of the knowledge-sharing feature.

13. The method of claim 10, wherein the notification comprises the topic tag reputation score of the second user.

14. The method of claim 10, wherein the topic tag reputation score of the second user is determined automatically by the host service.

15. The method of claim 14, wherein the host service increases the topic tag reputation score of the second user in response to the second user interacting with content of the collaboration tool having the topic tag.

16. The method of claim 14, wherein the host service decreases the topic tag reputation score of the second user in response to the second user not interacting with content of the collaboration tool having the topic tag for a selected time interval.

17. A method for notifying a first user of a collaboration tool of a another user of the collaboration tool having a topic-specific reputation, the method comprising:

receiving a user input from the first user to the collaboration tool via a client device executing a client application communicably coupled to a host service;

determining a topic tag for the user input based on semantic content of the user input;

querying a reputation database with the determined topic tag to obtain a dataset of elements, each element comprising a topic tag reputation score associated with one respective one user of the collaboration tool;

selecting an element of the dataset having the highest topic tag reputation score thereby indicating that the respective one user of the collaboration tool can be endorsed as having a high reputation with respect to the topic tag;

communicating the selected element to the client application;

displaying a name of a second user of the collaboration tool via the client application, the second user identified by the selected element, to the first user of the collaboration tool; and displaying a notification via the client application, the notification comprising a suggestion to the first user of the collaboration tool to contact the second user of the collaboration tool.

18. The method of claim 17, wherein the semantic content of the user input comprises:

a lemmatized set of words extracted from the user input; or a tokenized set of words extracted from the user input.

19. The method of claim 17, wherein the topic tag reputation score of the selected element is based, at least in part, on a job title of the second user.

* * * * *